W. W. McCOY.

BRUSH FOR POWER MARKING MACHINES.

APPLICATION FILED OCT. 18, 1911.

Reissued Apr. 9, 1912.

13,400.

2 SHEETS—SHEET 1.

Witnesses:

C. L. Rogers

Edward Maxwell

Inventor:

William W. McCoy, by Geo. S. Maxwell, Atty.

COLUMBIA PLANOGRAPH CO., WASHINGTON, D. C.

W. W. McCOY.

BRUSH FOR POWER MARKING MACHINES.

APPLICATION FILED OCT. 18, 1911.

Reissued Apr. 9, 1912.

13,400.

2 SHEETS—SHEET 2.

Witnesses:
C. L. Rogers
Edward Maxwell

Inventor:
William W. McCoy,
by Geo. H. Maxwell,
Atty.

COLUMBIA PLANOGRAPH CO., WASHINGTON, D. C.

UNITED STATES PATENT OFFICE.

WILLIAM W. McCOY, OF CINCINNATI, OHIO, ASSIGNOR TO LOUIS G. FREEMAN, OF CINCINNATI, OHIO.

BRUSH FOR POWER MARKING-MACHINES.

13,400. Specification of Reissued Letters Patent. Reissued Apr. 9, 1912.

Original No. 975,883, dated November 15, 1910, Serial No. 579,835. Application for reissue filed October 18, 1911. Serial No. 655,447.

*To all whom it may concern:*

Be it known that I, WILLIAM W. McCOY, a citizen of the United States of America, and resident of Cincinnati, county of Hamilton, State of Ohio, have invented certain new and useful Improvements in Brushes for Power Marking-Machines, of which the following is a specification.

The principal object of my invention is to provide a simple means for cleaning the type of a marking machine automatically between operations thereof, and preferably just before the application of the ink, without interfering in any way with the rapid marking of the goods.

More particularly the invention further provides a specially mounted cleaner brush mounted and connected for coöperation with the operative face of the marker to sweep over the same while the marker is out of operative position. The particular construction shown is also capable of distributing the ink on the type after it has been applied thereto.

Figure 1:
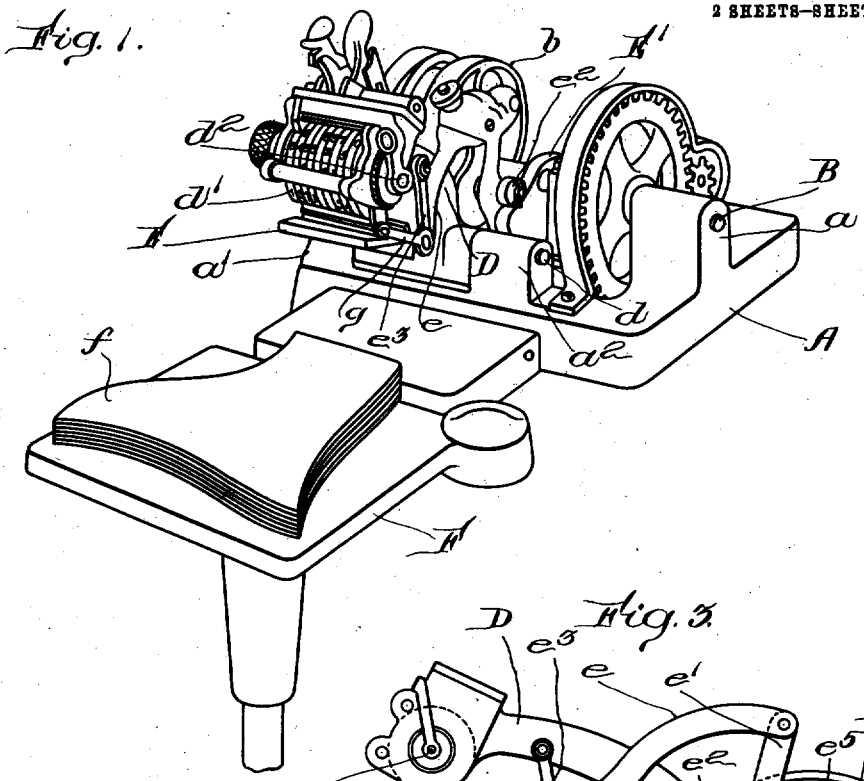
Figure 3:
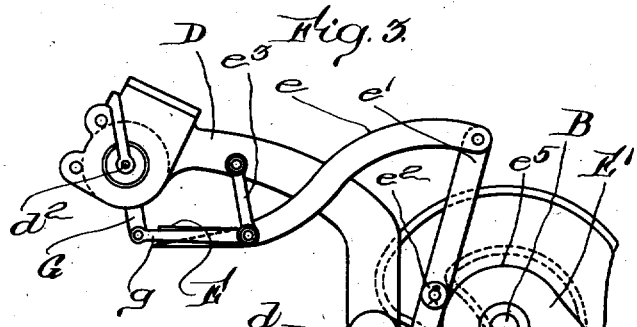
Figure 5:
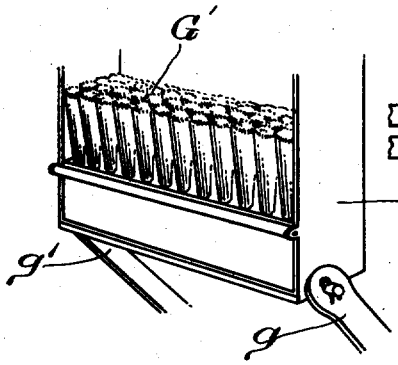
Figure 2:
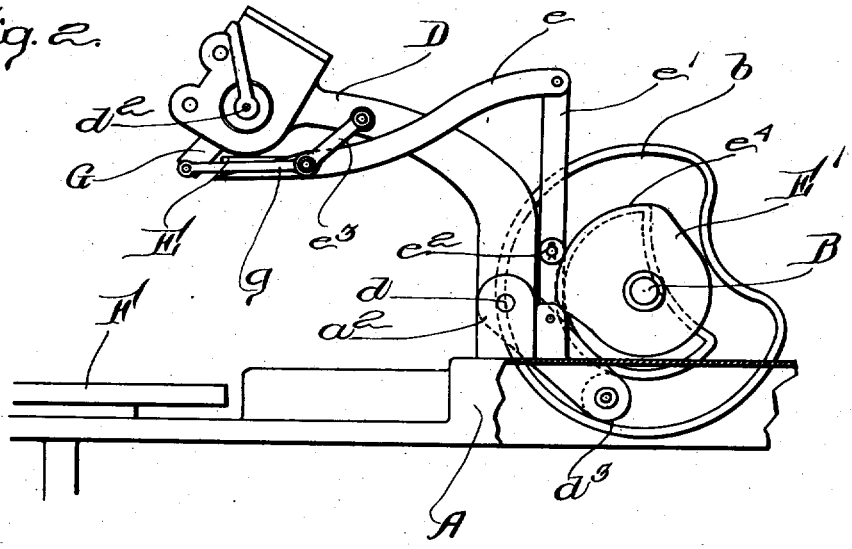
Figure 4:
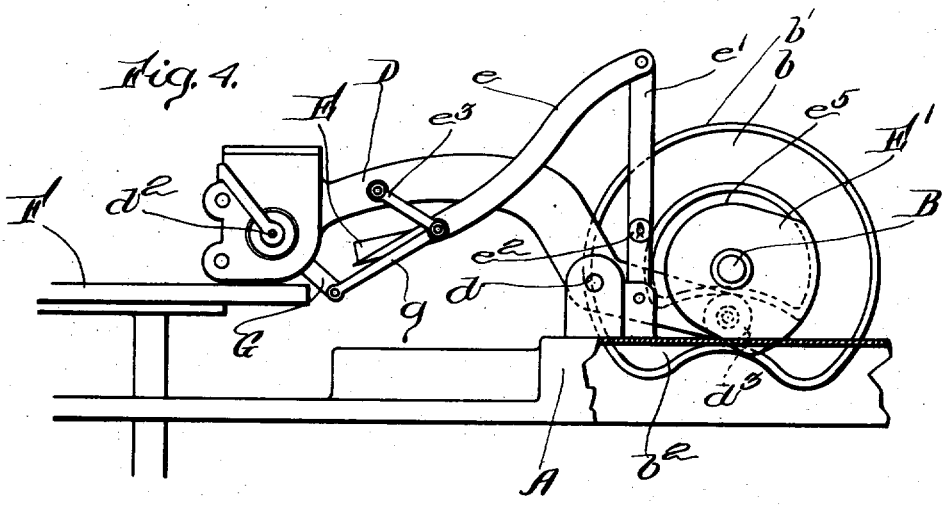

In the accompanying drawings forming a part hereof, Figure 1, is a perspective view of a power-marking machine, provided with a brush and a mechanism for actuating the same embodying my invention. Figs. 2, 3, and 4, are side elevations upon a somewhat enlarged scale of the type wheels, inking-pad, brush-frame, the levers and arms, upon which said parts are mounted, and the cams for actuating them, and showing them at various stages of the operation. Fig. 5, is a perspective view of the brush and a part of the brush frame.

Referring to the parts: Base A has at its sides journal lugs $a$, in which the main shaft B is journaled. At the forward edge of the base are journaled lugs $a'$, $a^2$, between which is mounted shaft $d$, upon which lever arm D, is journaled. The type wheels $d'$ are journaled upon shaft $d^2$, which is carried at the outer end of arm D. Lever arm D, has at its lower end a roller $d^3$ which engages a cam shaped groove $b$, in a cam $b'$, which is secured upon the shaft B, the rotation of which effects a reciprocation of the arm D, to carry the type wheels into contact with the table F, upon which the goods $f$ to be marked are placed.

Inking-pad E is carried at the outer end of arm $e$, which is pivoted at its inner end to arm $e'$, which is pivoted at its lower end to the base A and carries roller $e^2$, which contacts with cam E′, which is secured upon the shaft B, to effect the movement of the pad E toward and from the type wheels. Arm $e$ is connected by links $e^3$, with the arm D, said links being pivoted at one end to the arm D, and at the other end to the arm $e$.

Brush-frame G, has side members which are hung at their upper ends upon the shaft $d^2$, of the type-wheels, and at their lower ends are connected by links $g$, $g'$, with the arm $e$, the connections of said links being pivotal.

The cam groove $b$ is crescent shape, the part $b^2$ thereof being eccentric to the shaft B, and the remainder being concentric with the shaft B, so that while the roller $d^3$, is in the eccentric portion, the lever arm D, is moved toward and returned from the table F, and while the roller $d^3$ is in the concentric portion, the arm D remains in a normal position with the type-wheels raised from the table. The cam E′ has a portion $e^4$, which is eccentric to shaft B and which when brought in contact with the roller $e^2$, moves the pad E and the brush-frame forward, and a concentric portion $e^5$, which when in contact with the rollers $e^2$, holds the pad out of contact with the type-wheels. The cams $b'$, and E′, are so positioned upon the shaft B, that the eccentric portions thereof come into contact with their respective rollers consecutively.

The links $g$, $g'$, are made of a length such that when the inking-pad is in its normal or retracted position, the brush G′ stands in the rear of the contact points of the type, so that the brush does not interfere with the type coming in contact with the table F, and so that when the pad is in its forward position, the brush stands in front of the contact point of the type-wheels. Thus in the forward movement of the brush-frame, the brush sweeps over the type in front of the pad, and in the return movement the brush sweeps over the type back of the pad.

In operation supposing the shaft B, to have a motion opposite in direction to that of the hands of a clock, and to be in the normal position shown in Fig. 3. The roller $d^3$, entering in the eccentric portion $b^2$, will start the type-wheels toward the table, and when the roller $d^3$, reaches the center of said eccentric portion of the way $b^2$, the type-wheels will have come in contact with the table F, and when the roller $d^3$ has reached the opposite end of said eccentric portion, the type-wheels will have been raised to their normal position again, in which they will remain until the parts again resume the position shown in Fig. 3. While the roller $d^3$ is in said eccentric portion of the way $b$, the concentric portion $e^5$, of the cam E′, has been contacting with the roller $e^2$, hence the pad and the brush-frame have maintained their normal position in relation to the type-wheels. After the roller $d^3$ has emerged from said eccentric portion $b^2$, the eccentric portion $e^4$, contacts with roller $e^2$. This advances the forward end of arm $e$, carries the brush-frame forward and causes the brush G′ to contact with the type-wheels and to clean them. When the center of the eccentric portion $e^4$, contacts with the roller $e^2$, the inking pad E, contacts with the type, which are to be brought into contact with the goods upon the table. Further rotation of the cam E′, retracts the arm $e$, withdraws the pad E, from the type-wheels, and draws the brush backward over the type thus distributing the ink thereover. When the roller $e^2$, reaches the concentric portion $e^5$, the type have been properly inked, and the ink has been distributed properly, and the parts are in position to carry the type-wheels into contact with the goods to secure a clean cut impression of the type thereon.

It is to be understood that while in the illustrative embodiment of the invention set forth the brush moves backward over the type at the proper time so as to distribute and spread the ink over the type, that this is only an attribute of this special form of the invention and that the prime function of said brush and the essential combination in which it plays a part is for automatically cleaning the type while out of operative position between operations. It is likewise to be understood that while in the foregoing description and in certain of the claims the immediate marking element is designated "type," that this is not to be understood as restricted to conventional type forms, but is intended to include any embossing or impression surface. I therefore desire to protect the combination involving this feature broadly without regard to structural details or other limitations, except as set forth in the appended claims.

Having described my invention, what I claim as new and desire to secure by Letters Patent is:

1. A marking machine, comprising a holder for goods to be marked, a marker, a carrier therefor mounted to move the marker into and out of position for marking, and a cleaner mounted on said carrier to move with said marker in said operative movements and also mounted for separate movement to be moved in contact with the marker while out of operative position, and out of the way of the marker when it is in marking position.

2. A marking machine, comprising a marker mounted for reciprocating movement into and out of marking position and a cleaner coöperatively connected for timed operation relative to said marker, said cleaner being mounted to partake of the said movements of the marker and also being mounted for separate movements to be moved into contact with the marker while it is out of operative position and out of the way as the marker moves to marking position.

3. A marking machine, comprising a support for goods to be marked, a marker mounted for movement to and from marking position, a cleaner and an inker mounted to partake of the movements of said marker to and from its marking position, and also for separate movements to permit the cleaner and the inker to be moved into contact with the marker while out of operative position and then out of the way as the marker moves to marking position.

4. A marking machine, comprising a marker having a carrier adapted to move it alternately into and out of marking position, an inker and a cleaner connected for successive coöperation with said marker, in timed relation to the movements thereof, said cleaner and inker being mounted on said marker carrier to partake of the movements thereof, and also having separate movements adapted to bring them into contact with the marker while it is out of operative position and out of the way when it is in marking position.

5. A marking machine, comprising a marker, a reciprocating carrier therefor, a cleaner and an inker mounted on said carrier, said marker, cleaner and inker having a common driving means connected to operate the same in timed relation, and said cleaner and inker being mounted on said carrier to partake of the movements thereof, and also having separate movements transversely of the direction of marker movement to bring the cleaner and inker into contact with the marker while it is out of marking position and out of the way when it is in marking position.

6. A marking machine, comprising a holder for goods to be marked, a marker mounted for reciprocating movement to and from said holder, a cleaner and an inker mounted to partake of the movements of said marker, and also for movement in a direction transverse of the movement thereof to bring the cleaner and inker into contact with the marker while it is out of marking position and out of the way as it approaches marking position, and a common driving mechanism for said marker, cleaner and inker connected to cause relatively timed operation of said parts.

7. A marking machine comprising a rotatably adjustable marker mounted on a swinging carrier, a cleaner mounted to swing about the axis of adjustment of said marker, an inker in linked connection with said cleaner, and connections for producing timed operation of said parts to cause the cleaner and inker to contact with the operative portion of the marker while it is out of marking position and to move them out of the way as the marker moves to marking position.

8. In a power marking machine, the combination of a type bearing arm, type-wheels mounted upon said type-bearing arm, a brush-frame mounted upon the type-wheels, a brush carried by the frame and contacting with the wheels, a pad, a second arm adapted to carry the pad into contact with the wheels and a link connecting the frame and the second arm, whereby the brush distributes the ink over the type.

9. In a power marking machine, the combination of type-wheels, a shaft upon which the type-wheels are journaled, a lever arm upon which the shaft is mounted, a brush-frame pivoted upon said shaft, a brush mounted upon said frame, an inking pad, an arm at the outer ends of which said inking pad is mounted, links connecting the brush-frame and the arm of the inking pad and mechanism for actuating said lever arm and the arm of the inking pad, whereby the brush is carried over the type-wheels in advance of the pad and is carried back over the type-wheels in the rear of said pad.

10. In a power marking machine, the combination of a lever arm, type-wheels mounted at the forward end of said lever arm, an arm, an inking pad mounted at the forward end of said arm, links connecting the pad-bearing arm with the brush-frame, and the lever arm, a cam having an eccentric portion to contact with the lever arm, and effect a reciprocation of the type-wheels toward and from the goods to be marked, and a second cam having an eccentric portion to effect the reciprocation of the pad-bearing arm, said eccentric portions being in a position so that they are brought into contact with said parts consecutively, whereby the inking of the type and the distribution of the ink thereon, is effected while the type are out of contact with the goods.

In testimony whereof I affix my signature in the presence of two witnesses.

WILLIAM W. McCOY.

Witnesses:
HARRY F. FREKING,
JOSEPH R. GARDNER.

Copies of this patent may be obtained for five cents each, by addressing the "Commissioner of Patents, Washington, D. C."